United States Patent
Yamamoto et al.

(10) Patent No.: US 9,671,599 B2
(45) Date of Patent: Jun. 6, 2017

(54) FILM MIRROR, AND COMPOSITE FILM FOR USE IN SAME

(71) Applicant: FUJIFILM Corporation, Tokyo (JP)

(72) Inventors: Yuya Yamamoto, Kanagawa (JP); Yuya Agata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 309 days.

(21) Appl. No.: 14/669,716

(22) Filed: Mar. 26, 2015

(65) Prior Publication Data
US 2015/0205085 A1    Jul. 23, 2015

Related U.S. Application Data

(63) Continuation of application No. PCT/JP2013/075669, filed on Sep. 24, 2013.

(30) Foreign Application Priority Data

Sep. 28, 2012  (JP) ................. 2012-217883

(51) Int. Cl.
G02B 5/08        (2006.01)
G02B 19/00       (2006.01)
(Continued)

(52) U.S. Cl.
CPC ......... G02B 19/0023 (2013.01); B05D 3/067 (2013.01); F24J 2/1057 (2013.01);
(Continued)

(58) Field of Classification Search
CPC .. G02B 19/0023; G02B 19/0042; G02B 1/14; G02B 1/04; G02B 1/105; G02B 5/0808;
(Continued)

(56) References Cited

U.S. PATENT DOCUMENTS

| 6,392,138 B1 | 5/2002 | Ichiba et al. |
| 2010/0245991 A1 | 9/2010 | Ishihara et al. |
(Continued)

FOREIGN PATENT DOCUMENTS

| JP | 2004-314408 A | 11/2004 |
| JP | 2009-215179 A | 9/2009 |
(Continued)

OTHER PUBLICATIONS

Notification of Reasons for Refusal issued by the Japanese Patent Office on Sep. 8, 2015 in connection with Japanese Patent Application No. 2012-217883.
(Continued)

*Primary Examiner* — Bumsuk Won
*Assistant Examiner* — Collin X Beatty
(74) *Attorney, Agent, or Firm* — Edwards Neils LLC; Jean C. Edwards, Esq

(57) ABSTRACT

The film mirror includes a resin substrate; a metal reflective layer; and a surface coating layer, a ratio of a number of fluorine atoms to a number of carbon atoms in a surface layer portion of the surface coating layer as expressed by F/C is 0.21 to 1.00 and the surface coating layer has a surface hardness of more than 100 N/mm$^2$ and an elastic recovery rate of 60% or more. The film mirror has stain-proof properties, and scratch resistance so that the surface is resistant to scratches in collision with sandy dust and is also resistant to scratches upon cleaning with a brush.

14 Claims, 3 Drawing Sheets

(51) Int. Cl.
| | | |
|---|---|---|
| *G02B 1/10* | (2015.01) | |
| *F24J 2/10* | (2006.01) | |
| *G02B 1/14* | (2015.01) | |
| *B05D 3/06* | (2006.01) | |
| *G02B 1/04* | (2006.01) | |
| *B05D 5/06* | (2006.01) | |

(52) U.S. Cl.
CPC ............... *G02B 1/04* (2013.01); *G02B 1/105* (2013.01); *G02B 1/14* (2015.01); *G02B 5/0808* (2013.01); *G02B 19/0042* (2013.01); *B05D 5/067* (2013.01); *Y02E 10/40* (2013.01); *Y10T 428/31573* (2015.04); *Y10T 428/31909* (2015.04)

(58) Field of Classification Search
CPC ........ B05D 3/067; B05D 5/067; F24J 2/1057; Y10T 428/31573; Y10T 428/31909; Y02E 10/40
USPC ............... 359/884, 584, 360, 507; 428/421; 427/162, 487, 385.5
See application file for complete search history.

(56) References Cited

U.S. PATENT DOCUMENTS

| | | | |
|---|---|---|---|
| 2011/0003909 A1 | 1/2011 | Fujita et al. | |
| 2012/0301728 A1* | 11/2012 | Saito ................. | C08G 18/6279 428/421 |
| 2013/0040148 A1* | 2/2013 | Masuda ................. | C09D 7/001 428/421 |
| 2013/0293951 A1* | 11/2013 | Kumagai ............... | F24J 2/1057 359/359 |

FOREIGN PATENT DOCUMENTS

| | | |
|---|---|---|
| JP | 2010-034513 A | 2/2010 |
| JP | 2010-237415 A | 10/2010 |
| JP | 2011-077397 A | 4/2011 |
| JP | 2011-169987 A | 9/2011 |
| JP | 2012-121999 A | 6/2012 |
| WO | 00/20489 A1 | 4/2000 |
| WO | 2011/105515 A1 | 9/2011 |

OTHER PUBLICATIONS

Extended European Search Report, issued by the European Patent Office on Mar. 9, 2016 in connection with European Patent Application No. 13842030.2.

Notification of Reasons for Refusal issued by the Japanese Patent Office on May 10, 2016 in connection with Japanese Patent Application No. 2012-217883.

Office Action, issued by the State Intellectual Property Office (SIPO) of China on May 3, 2016, in connection with corresponding Chinese Patent Application No. 201380050382.2.

Office Action, issued by the State Intellectual Property Office (SIPO) of China on Jan. 9, 2017, in connection with corresponding Chinese Patent Application No. 201380050382.2.

International Preliminary Report on Patentability issued by WIPO on Apr. 9, 2015 in connection with Intl. Patent Application No. PCT/JP2013/075669.

International Search Report issued in PCT/JP2013/075669 on Dec. 24, 2013.

\* cited by examiner

FILM MIRROR, AND COMPOSITE FILM FOR USE IN SAME

CROSS-REFERENCE TO RELATED APPLICATIONS

This application is a Continuation of PCT International Application No. PCT/JP2013/075669 filed on Sep. 24, 2013, which was published under PCT Article 21(2) in Japanese, which claims priority under 35 U.S.C. §119(a) to Japanese Application No. 2012-217883 filed on Sep. 28, 2012. The above applications are hereby expressly incorporated by reference, in their entirety, into the present application.

BACKGROUND OF THE INVENTION

The present invention relates to a film mirror for solar power generation and a composite film for use therein.

Sunlight reflectors are exposed to ultraviolet light and heat from sunlight, weather, sandy dust and the like, and therefore glass mirrors have conventionally been used therefor.

When using such glass mirrors, however, there have been a problem of breakage during transportation and a problem of increased construction cost because of high strength required for mounts on which the mirrors are to be mounted.

In order to solve such problems, it has been proposed in recent years to replace glass mirrors by reflective resin sheets (hereinafter also referred to as "film mirrors").

The surface layer of a film mirror is required to have stain-proof properties and scratch resistance. As for the scratch resistance, the surface is required to be resistant to scratches in collision with sandy dust grain aggregates in a sandstorm and is also required to be resistant to scratches upon cleaning with a brush.

A composite film is known which protects against scratches upon collision with sandy dust by forming a soft resin layer having self-repairing properties as the surface layer of a resin substrate.

The surface layer made of soft resin had the following problem: Scratches due to impact of fine objects such as sandy dust do not occur but permanent scratches occur due to cleaning with a brush which involves hard scraping to such an extent that the elastic limit is exceeded.

JP 2004-314408 A describes a low reflection film which can protect against reflection due to outside light and is also excellent in dust resistance and which particularly has sufficient abrasion resistance to prevent the transparency from being impaired by abrasion due to friction and is also excellent in contamination resistance. However, the abrasion resistance is tested in order to evaluate the scratch resistance by scraping the film back and forth using white flannel and the performance required for the film mirror to be protected against surface scratches that may be caused by collision with sandy dust grain aggregates is not examined.

SUMMARY OF INVENTION

An object of the present invention is to provide a film mirror which has stain-proof properties and which has scratch resistance so that the surface is resistant to scratches in collision with sandy dust and is also resistant to scratches upon cleaning with a brush, these properties having been difficult to achieve at the same time in the conventional technique.

Specifically, the invention provides the following.

(1) A film mirror comprising: a resin substrate; a metal reflective layer; and a surface coating layer, wherein a ratio of a number of fluorine atoms to a number of carbon atoms in a surface layer portion of the surface coating layer as expressed by F/C is 0.21 to 1.00 and wherein the surface coating layer has a surface hardness of more than 100 $N/mm^2$ and an elastic recovery rate of 60% or more.

(2) The film mirror according to (1), wherein a resin making up the surface coating layer contains a polymer of monomers including at least one type of fluorine-containing monomer.

(3) The film mirror according to (1), wherein a resin making up the surface coating layer contains a polymer of monomers including at least one type of fluorine-containing acrylate monomer and at least one type of non-fluorine-containing polyfunctional acrylate monomer.

(4) The film mirror according to (1), wherein a resin making up the surface coating layer contains a polymer of monomers including at least one type of fluorine-containing epoxy and/or oxetane monomer and at least one type of non-fluorine-containing epoxy and/or oxetane monomer.

(5) The film mirror according to (1), comprising a step of forming the surface coating layer by photo-curing under exposure to ultraviolet radiation at an accumulated light quantity of 95 $mJ/cm^2$ or more.

(6) The film mirror according to (1), comprising a step of forming the surface coating layer by photo-curing in presence of oxygen.

(7) The film mirror according to (1), wherein a resin making up the surface coating layer contains a polymerizable monomer of which polymerization is less inhibited by oxygen.

(8) The film mirror according to (1), wherein a resin making up the surface coating layer contains a polymerizable monomer of which polymerization is less inhibited by oxygen, the polymerizable monomer represented by general formula (1) or general formula (2) shown below:

[Chemical Formula 1]

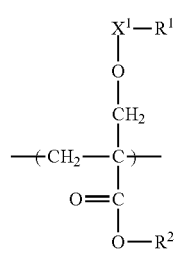

General formula (1)

-continued

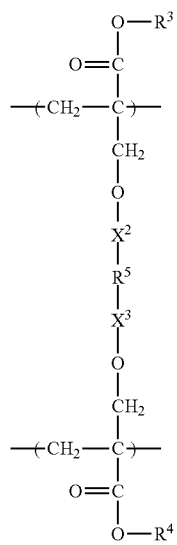

General formula (2)

[Chemical Formula 1]

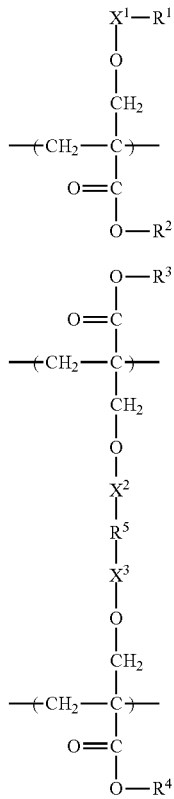

[wherein $R^1$ represents a hydrogen atom or a hydrocarbon group, $R^2$ to $R^4$ each independently represent a hydrocarbon group, $R^5$ represents an alkylene group which may have an ether group inserted in a chain, and $X^1$ to $X^3$ each independently represent a single bond or a carbonyl group].

(9) The film mirror according to (1), wherein a difference between heat shrinkage of the resin substrate at 100° C. and polymerization shrinkage of the surface coating layer as represented by [(heat shrinkage of resin substrate)−(polymerization shrinkage of surface coating layer)] is within 10%.

(10) A film mirror comprising: a first resin substrate; a metal reflective layer; a second resin substrate; and a surface coating layer, wherein a ratio of a number of fluorine atoms to a number of carbon atoms in a surface layer portion of the surface coating layer as expressed by F/C is 0.21 to 1.00 and wherein the surface coating layer has a hardness of more than 100 N/mm² and an elastic recovery rate of 60% or more.

(11) The film mirror according to (1) for use in concentration of sunlight.

(12) A composite film comprising: a surface coating layer formed on a resin substrate, wherein a ratio of a number of fluorine atoms to a number of carbon atoms in a surface layer portion of the surface coating layer as expressed by F/C is 0.21 to 1.00 and wherein the surface coating layer has a surface hardness of more than 100 N/mm² and an elastic recovery rate of 60% or more.

(13) The composite film according to (12), comprising a primer layer between the resin substrate and the surface coating layer.

(14) The film mirror according to (4), wherein the surface coating layer is formed by photo-curing under exposure to ultraviolet radiation at an accumulated light quantity of 95 mJ/cm² or more.

(15) The film mirror according to (6), wherein a resin making up the surface coating layer contains a polymerizable monomer of which polymerization is less inhibited by oxygen, the polymerizable monomer represented by general formula (1) or general formula (2) shown below:

[wherein $R^1$ represents a hydrogen atom or a hydrocarbon group, $R^2$ to $R^4$ each independently represent a hydrocarbon group, $R^5$ represents an alkylene group which may have an ether group inserted in a chain, and $X^1$ to $X^3$ each independently represent a single bond or a carbonyl group].

(16) The film mirror according to (4), wherein a difference between heat shrinkage of the resin substrate at 100° C. and polymerization shrinkage of the surface coating layer as represented by [(heat shrinkage of resin substrate)−(polymerization shrinkage of surface coating layer)] is within 10%.

(17) The film mirror according to (10) for use in concentration of sunlight.

The present invention provides a film mirror which has stain-proof properties and which has scratch resistance so that the surface is resistant to scratches in collision with sandy dust and is also resistant to scratches upon cleaning with a brush.

DETAILED DESCRIPTION OF THE INVENTION

A film mirror according to a first aspect of the invention is a film mirror including a resin substrate, a metal reflective layer and a surface coating layer, wherein the ratio of the number of fluorine atoms to the number of carbon atoms in a surface layer portion of resin making up the surface coating layer as expressed by F/C (hereinafter often referred to as "surface fluorine content") is 0.21 to 1.00 and wherein the surface coating layer has a surface hardness of more than 100 N/mm$^2$ and an elastic recovery rate of 60% or more.

The surface layer portion refers to a portion to a measurement depth of about 10 nm when measured with an X-ray photoelectron spectrometer.

Figure 1:
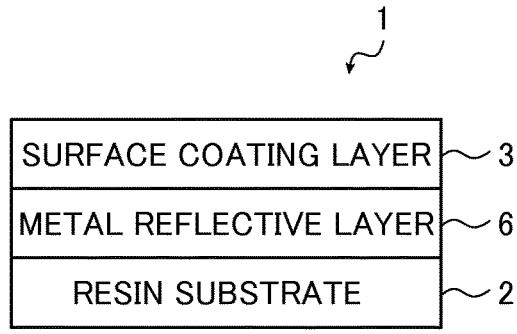
FIG. 1 is a cross-sectional view schematically showing an embodiment of a film mirror of the invention.

The present invention is described below with reference to a preferred embodiment of the film mirror shown in FIG. 1. FIG. 1 illustrates a film mirror 1 which includes a resin substrate 2, a metal reflective layer 6 and a surface coating layer 3 formed in this order. According to the invention, however, the number of each of these layers may be one or more than one, and these layers may be formed in any order. Layers such as a primer layer and an adhesion layer may be formed between the respective layers and layers other than these may be formed therebetween. A back coat layer may be formed on a surface of the resin substrate 2 on the side opposite to the side on which the metal reflective layer 6 and the surface coating layer 3 are formed.

Figure 2:
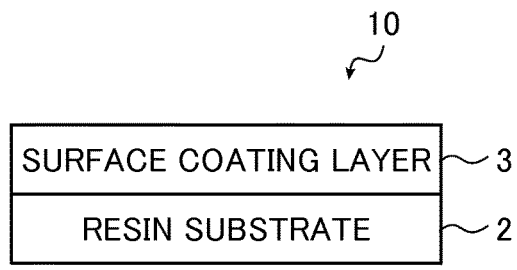
FIG. 2 is a cross-sectional view schematically showing an embodiment of a composite film of the invention.

A second aspect of the invention provides a composite film 10. The composite film 10 is used in a film mirror 30 according to a third aspect which will be described later. The present invention is described with reference to a preferred embodiment of the composite film 10 of the invention shown in FIG. 2. FIG. 2 illustrates a case of the composite film 10 including a resin substrate 2 and a surface coating layer 3. According to the composite film of the invention, however, the number of each of these layers may be one or more than one, and these layers may be formed in any order. Layers such as a primer layer and an adhesion layer may be formed between the respective layers and layers other than these may be formed therebetween.

Figure 7:
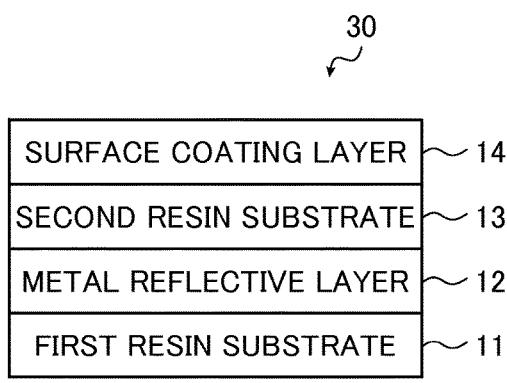
FIG. 7 is a cross-sectional view schematically showing another embodiment of the film mirror of the invention.

The third aspect of the invention provides the film mirror 30. The film mirror 30 is one having a first resin substrate and a second resin substrate. FIG. 7 shows a preferred example of the film mirror 30. The film mirror 30 shown in FIG. 7 is one including a first resin substrate 11, a metal reflective layer 12, a second resin substrate 13 and a surface coating layer 14, wherein a resin making up the surface coating layer has a surface fluorine content of 0.21 to 1.00 and wherein the surface coating layer has a surface hardness of more than 100 N/mm$^2$ and an elastic recovery rate of 60% or more.

A primer layer or an adhesion layer may be formed between the first resin substrate and the metal reflective layer or between the metal reflective layer and the second resin substrate. Layers other than these may be formed therebetween.

A primer layer or an adhesion layer may be formed between the second resin substrate and the surface coating layer. Layers other than these may be formed therebetween.

A back coat layer may be formed between the second resin substrate and the metal reflective layer.

The materials of the first resin substrate and the second resin substrate may be the same as or different from each other but the second resin substrate preferably has a thickness which is up to half the thickness of the first resin substrate. The thickness within this range is preferable because the transparency is ensured while also achieving flatness and mechanical strength of the film mirror.

The third aspect of the invention also includes a film mirror obtained by joining the resin substrate of the composite film of the invention to a separately manufactured laminate having a metal reflective layer on a first resin substrate through an adhesion layer or by means of direct thermal fusion bonding.

In the present invention, the following experiments have been carried out to examine the stain-proof properties and the scratch resistance required for the film mirror and to determine a physical property area where the performance necessary to the film mirror is achieved at the same time, thus reaching the present invention.

As for the scratch resistance required for the surface coating layer of the film mirror, It is necessary to achieve the following two properties at the same time:

(1) Resistance to scratches in collision with sandy dust in a sandstorm; and (2) resistance to scratches upon cleaning with a brush.

In order to find conditions satisfying (1) and (2) above and physical properties satisfying the scratch resistance, a composite film as shown in FIG. 2 was prepared as will be shown later in Examples and Comparative Examples. Prepared samples were used to carry out the tests shown in the table below. The results are shown in graphs of FIGS. 3 to 5 and the respective evaluation items were examined.

TABLE 1

Figure 3:
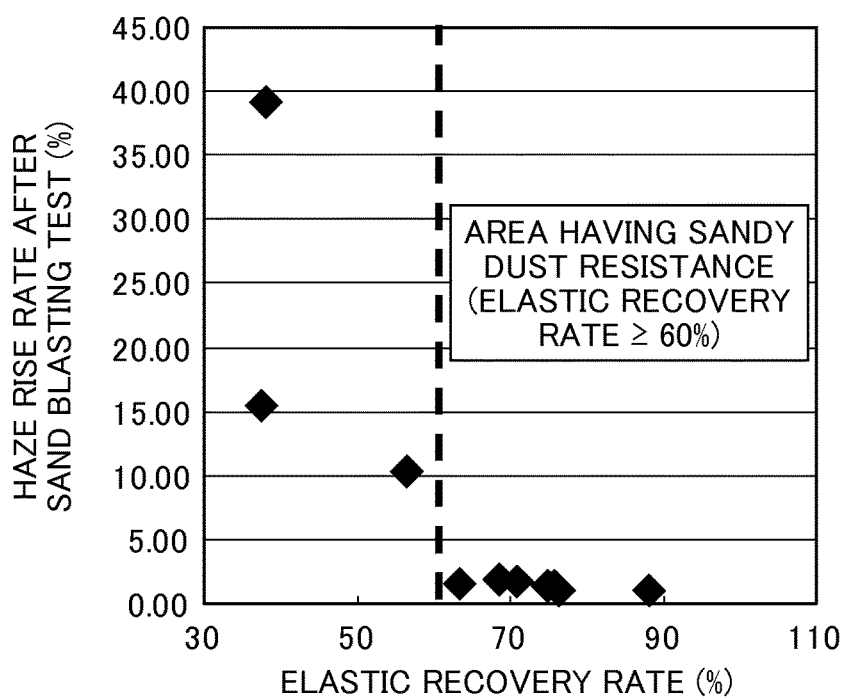
FIG. 3 is a graph showing the elastic recovery rate of a surface coating layer in the horizontal axis and the haze value rise rate (%) of a composite film after having undergone sand blasting test in the vertical axis.
Figure 4:
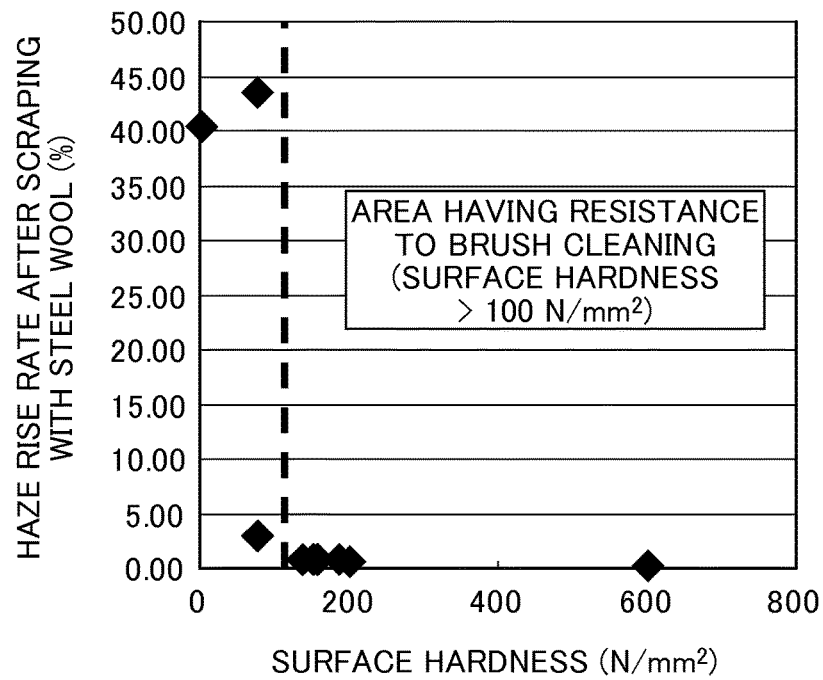
FIG. 4 is a graph showing the surface hardness of the surface coating layer in the horizontal axis and the haze value rise rate (%) after scraping with steel wool in the vertical axis.
Figure 5:
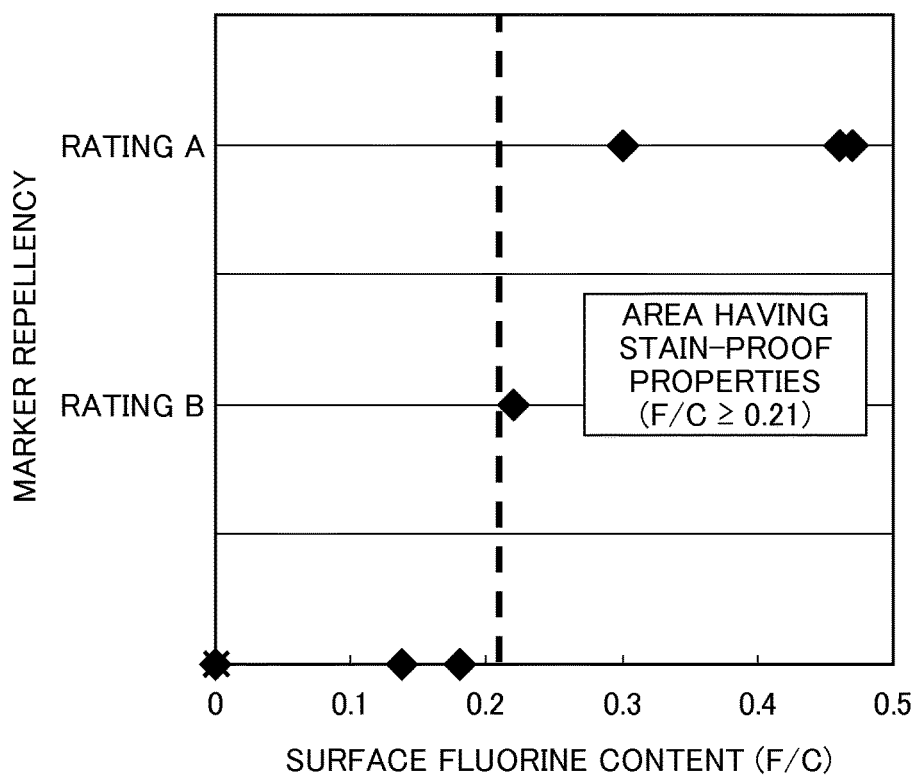
FIG. 5 is a graph showing the ratio (F/C) of the number of fluorine atoms to the number of carbon atoms in a surface layer portion of the surface coating layer in the horizontal axis and the marker repellency in the vertical axis.

| Evaluation item | Test | Result |
| --- | --- | --- |
| Evaluation of sandy dust resistance | Sand blasting test | FIG. 3 |
| Evaluation of resistance to brush cleaning | Steel wool test | FIG. 4 |
| Evaluation of stain-proof properties | Marker repellency test | FIG. 5 |

<Sandy Dust Resistance Test>

The elastic recovery rate of a surface coating layer and the haze value rise rate of a composite film after having undergone sand blasting test were shown in FIG. 3 to evaluate the sandy dust resistance. The results of FIG. 3 revealed that the haze value rise rate after the sandy dust resistance test correlates with the elastic recovery rate of the surface coating layer. Since collision between sandy dust with a small weight and the surface layer is less likely to cause deformation exceeding an elastic limit point and more likely to ensure the cushioning properties of the surface coating layer, the elastic recovery rate was found to act more effectively than the surface hardness of the surface coating layer.

<Steel Wool Resistance Test (Evaluation of Resistance to Brush Cleaning)>

The surface hardness of the surface coating layer and the haze value rise rate after scraping with steel wool were shown in FIG. 4 to evaluate the resistance to brush cleaning.

A steel wool scraping test is often carried out to evaluate the resistance to scraping as in cleaning with a brush. The results of FIG. 4 revealed that the steel wool resistance test correlates with the surface hardness of the surface coating layer. A forced scraping test in which an external force exceeding an elastic limit point is easily applied revealed that the surface hardness which is simpler than the elastic recovery rate acts effectively.

<Marker Repellency (Evaluation of Stain-Proof Properties)>

A line was drawn on a surface of a composite film with a black marker and repellency was visually checked. The stain-proof properties against mud can be simply evaluated by the marker repellency test. The surface fluorine content (F/C) in the surface coating layer and the marker repellency were shown in FIG. 5 to evaluate the stain-proof properties of the surface coating layer. The marker repellency was found to correlate with the surface fluorine content (F/C). An excessive surface fluorine content (F/C) was found to deteriorate the visual surface state.

Figure 6:
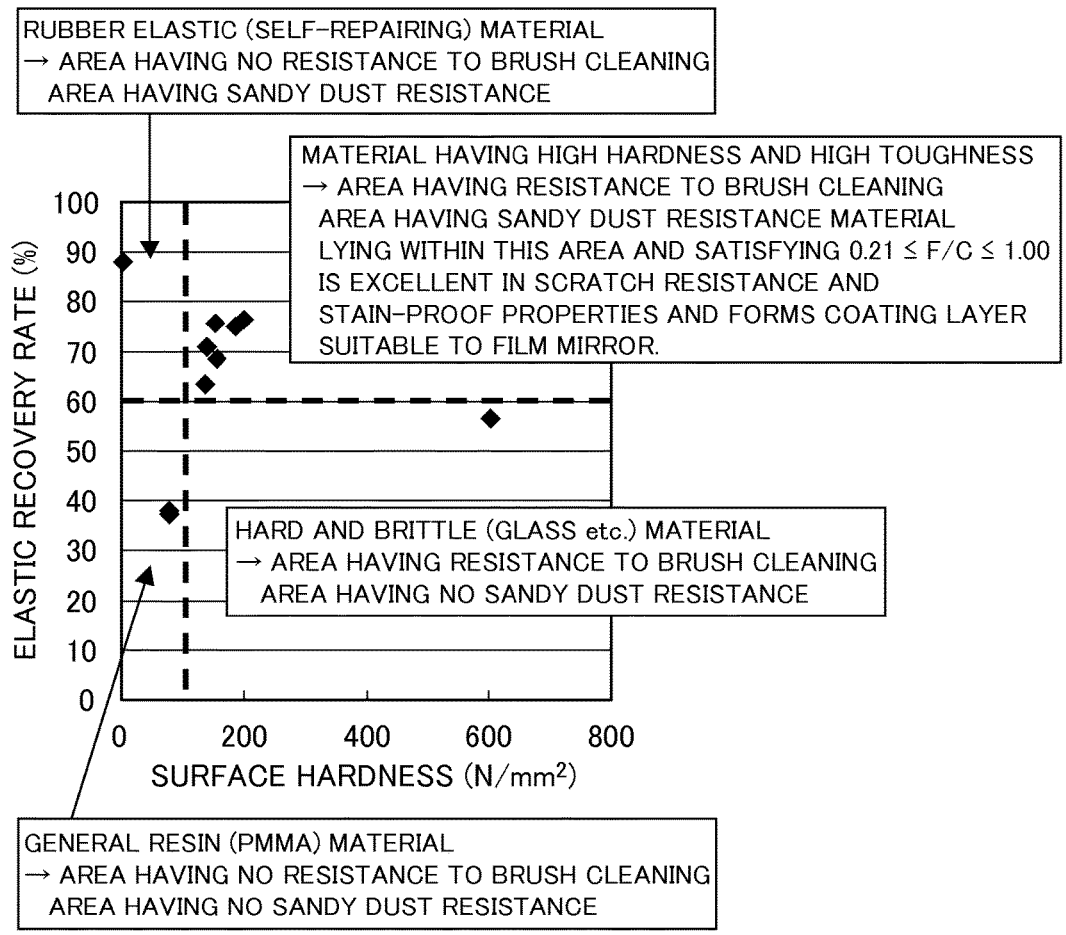
FIG. 6 is a graph showing a physical property area where performance necessary to the film mirror is achieved at the same time.

The above considerations revealed that physical properties allowing both of the scratch resistance and the stain-proof properties which are necessary to the film mirror include a surface hardness and an elastic recovery rate lying in an area shown in FIG. 6 and a surface fluorine content F/C of 0.21 or more but up to 1.00, and that it is necessary to form such a surface coating layer that these physical properties are satisfied.

The surface fluorine content expressed by F/C is preferably in a range of 0.25 or more but up to 1.00 and more preferably 0.30 to 0.5. This is because when the surface fluorine content is too low, the stain-proof properties are not sufficient, whereas when the surface fluorine content is increased too much, unevenness occurs during application due to excessive addition of a fluorine monomer.

The surface hardness is preferably in a range of 130 to 600 N/mm$^2$ and more preferably 180 to 600 N/mm$^2$. This is because the haze value rise rate after the steel wool scraping test decreases with increasing surface hardness.

The elastic recovery rate is preferably in a range of 60 to 100% and more preferably 75 to 100%. This is because the haze value rise rate after the sandy dust resistance test decreases with increasing elastic recovery rate.

The hardness of the surface coating layer (hereinafter referred to also as "surface hardness") as used herein refers to the Martens hardness as measured according to ISO 14577-1 (instrumented indentation hardness) and can be measured with an ultra-microhardness tester (DUH-201S manufactured by Shimadzu Corporation).

The maximum indentation depth hmax and the indentation depth after load removal hf are measured according to ISO 14577-1 (instrumented indentation hardness) to obtain the elastic recovery amount (hmax−hf) and the elastic recovery rate of the surface coating layer can be calculated from (hmax−hf)/hmax. Measurement can be made using, for example, an ultra-microhardness tester (DUH-2015 manufactured by Shimadzu Corporation).

Materials of the resin substrate, the metal reflective layer and surface coating layer that may be used in each of the film mirror according to the first aspect of the invention, the composite film according to the second aspect of the invention and the film mirror according to the third aspect of the invention are not limited as long as they have the above-described physical properties after having been applied onto the substrate and cured. Materials and dimensions to be described below can be preferably used.

[Resin Substrate]

The resin substrate for use in the invention is not particularly limited and exemplary materials to form the resin substrate include polyolefin resins such as polyethylene and polypropylene; polyester resins such as polyethylene terephthalate and polyethylene naphthalate; polycarbonate resins; acrylic resins such as polymethyl methacrylate; polyamide resins; polyimide resins; polyvinyl chloride resins; polyphenylene sulfide resins; polyether sulfone resins; polyethylene sulfide resins; polyphenylene ether resins; styrene resins; and cellulose resins such as cellulose acetate.

Among these, acrylic resins are preferable for the resin substrate because of high transparency and weather resistance of the composite film.

According to the invention, the shape of the resin substrate is not particularly limited. The resin substrate may have any of a planar surface, a diffusing surface, a concave surface and a convex surface, for example.

Likewise, the thickness of the resin substrate is not particularly limited because it also depends on the shape of the resin substrate. In general, however, the resin substrate preferably has a thickness of 25 to 200 μm when having a planar shape.

[Surface Coating Layer]

The resin making up the surface coating layer of the invention is not limited and preferably contains a polymer of monomers including at least one type of fluorine-containing monomer. More specifically, use can be more preferably made of (1) a polymer of monomers including at least one type of fluorine-containing acrylate monomer and at least one type of non-fluorine-containing polyfunctional acrylate monomer; (2) a polymer of monomers including at least one type of fluorine-containing epoxy and/or oxetane monomer and at least one type of non-fluorine-containing epoxy and/or oxetane monomer; and (3) a polymer containing a polymerizable monomer of which the polymerization is less inhibited by oxygen. The ratio between the various monomers in these resins and the exposure conditions can be changed to adjust the surface hardness of the cured surface coating layer to more than 100 N/mm$^2$, the elastic recovery rate to 60% or more and the surface fluorine content expressed by the F/C ratio in the range according to the invention, thereby preparing a coating liquid for the surface coating layer.

A case where the polymerization shrinkage of the acrylic monomer for use in the surface coating layer is at approximately the same level as the heat shrinkage of the resin substrate is preferable because these shrinkages are canceled each other to reduce curling of the film mirror.

Difference between heat shrinkage of resin substrate at 100° C. and polymerization shrinkage of surface coating layer The expression: [(heat shrinkage of resin substrate)−(polymerization shrinkage of surface coating layer)]10% is preferably satisfied because the curling resistance is excellent when the difference is within this range. The difference is preferably up to 5% and more preferably up to 3%. The curling resistance refers to a resistance to shape warping deformation of a laminate which is a composite film or a film mirror, as a result of thermal history. The curling resistance is measured by the method to be described later in Examples and Comparative Examples.

The resin making up the surface coating layer of the invention preferably contains a polymer of monomers including at least one type of fluorine-containing monomer. Examples of the fluorine-containing monomer include a fluorine-containing acrylate monomer, a fluorine-containing olefinic monomer, a fluorine-containing acetylene monomer, a fluorine-containing epoxy monomer, a fluorine-containing oxetane monomer and a fluorine-containing vinyl ether monomer.

To be more specific, the following compounds can be illustrated as (1) the polymer of monomers including at least one type of fluorine-containing acrylate monomer and at least one type of non-fluorine-containing polyfunctional acrylate monomer.

The fluorine-containing acrylate monomer that may be used in the surface coating layer of the invention is not particularly limited. To be more specific, the compounds f-1 to f-10 described in paragraph number [0018] and X-1 to X-32 described in paragraph numbers [0023] to [0027] of JP 2006-28409 A as well as the following compounds (X-33), (X-34) and (X-35) can also be preferably used.

[Chemical Formula 2]

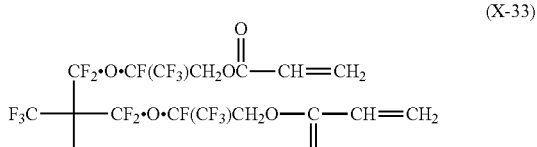
(X-33)

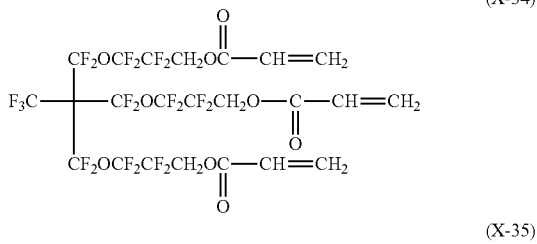
(X-34)

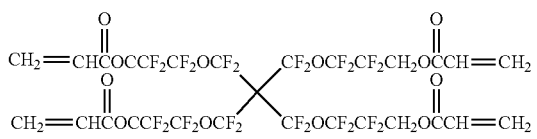
(X-35)

The compounds described in paragraph numbers [0135] to of WO 2005/059601 and the compounds described in paragraph numbers [0014] to [0028] of JP 2006-291077 A can also be suitably used.

The non-fluorine-containing polyfunctional acrylate monomer that may be used is a compound containing two or more (meth)acryloyl groups in one molecule. Specific examples thereof include (meth)acrylic acid diesters of alkylene glycols such as neopentyl glycol acrylate, 1,6-hexanediol(meth)acrylate, and propylene glycol di(meth)acrylate; (meth)acrylic acid diesters of polyoxyalkylene glycols such as triethylene glycol di(meth)acrylate, dipropylene glycol di(meth)acrylate, polyethylene glycol di(meth)acrylate and polypropylene glycol di(meth)acrylate; (meth)acrylic acid diesters of polyhydric alcohols such as pentaerythritol di(meth)acrylate; and (meth)acrylic acid diesters of ethylene oxide or propylene oxide adducts such as 2,2-bis{4-(acryloxy.diethoxy)phenyl}propane and 2,2-bis{4-(acryloxy.polypropoxy)phenyl}propane. These are described in detail in JP 2010-061044 A.

To be more specific, the following compounds can be illustrated as (2) the polymer of monomers including at least one type of fluorine-containing epoxy and/or oxetane monomer and at least one type of non-fluorine-containing epoxy and/or oxetane monomer.

<Non-Fluorine-Containing Epoxy and/or Oxetane Monomer>

Exemplary epoxy compounds that may be used in the invention include an aromatic epoxide, an alicyclic epoxide and an aliphatic epoxide to be illustrated below. Examples of the aromatic epoxide include di- or polyglycidyl ethers of bisphenol A or alkylene oxide adducts thereof, di- or polyglycidyl ethers of hydrogenated bisphenol A or alkylene oxide adducts thereof, and novolac epoxy resins. Examples of the alkylene oxide as used herein include ethylene oxide and propylene oxide.

An example of the alicyclic epoxide includes a cyclohexene oxide or cyclopentene oxide-containing compound as obtained by epoxidizing a compound having at least one cycloalkane ring such as cyclohexene ring or cyclopentene ring with a suitable oxidizing agent such as hydrogen peroxide or a peracid. The aliphatic epoxide is preferably a di- or polyglycidyl ether of an aliphatic polyhydric alcohol or an alkylene oxide adduct thereof and typical examples thereof include diglycidyl ethers of alkylene glycols such as ethylene glycol diglycidyl ether, propylene glycol diglycidyl ether and 1,6-hexanediol diglycidyl ether; polyglycidyl ethers of polyhydric alcohols such as di- or triglycidyl ethers of glycerol or alkylene oxide adducts thereof; and diglycidyl ethers of polyalkylene glycols such as diglycidyl ethers of polyethylene glycol or alkylene oxide adducts thereof and diglycidyl ethers of polypropylene glycol or alkylene oxide adducts thereof. Examples of the alkylene oxide as used herein include ethylene oxide and propylene oxide.

The aromatic epoxy monomer is not particularly limited and examples thereof include bisphenol skeleton-containing epoxy monomers such as bisphenol A, bisphenol F and bisphenol S epoxy monomers; dicyclopentadiene skeleton-containing epoxy monomers such as dicyclopentadiene dioxide and dicyclopentadiene skeleton-containing phenol novolac epoxy monomers; naphthalene skeleton-containing epoxy monomers such as 1-glycidyl naphthalene, 2-glycidyl naphthalene, 1,2-diglycidyl naphthalene, 1,5-diglycidyl naphthalene, 1,6-diglycidyl naphthalene, 1,7-diglycidyl naphthalene, 2,7-diglycidyl naphthalene, triglycidyl naphthalene, and 1,2,5,6-tetraglycidyl naphthalene; adamantene skeleton-containing epoxy monomers such as 1,3-bis(4-glycidyloxyphenyl)adamantene, and 2,2-bis(4-glycidyloxyphenyl)adamantene; fluorene skeleton-containing epoxy monomers such as 9,9-bis(4-glycidyloxyphenyl)fluorene, 9,9-bis(4-glycidyloxy-3-methylphenyl)fluorene, 9,9-bis(4-glycidyloxy-3-chlorophenyl)fluorene, 9,9-bis(4-glycidyloxy-3-bromophenyl)fluorene, 9,9-bis(4-glycidyloxy-3-fluorophenyl)fluorene, 9,9-bis(4-glycidyloxy-3-methoxyphenyl)fluorene, 9,9-bis(4-glycidyloxy-3,5-dimethylphenyl)fluorene, 9,9-bis(4-glycidyloxy-3,5-dichlorophenyl)fluorene, and 9,9-bis(4-glycidyloxy-3,5- dibromophenyl)fluorene; biphenyl skeleton-containing epoxy monomer such as 4,4'-diglycidylbiphenyl, and 4,4'-diglycidyl-3,3'5,5'-tetramethylbiphenyl; bi(glycidyloxyphenyl)methane skeleton-containing epoxy monomers such as 1,1'-bi(2,7-glycidyloxynaphthyl)methane, 1,8'-bi(2,7-glycidyloxynaphthyl)methane, 1,1'-bi(3,7-glycidyloxynaphthyl)methane, 1,8'-bi(3,7-glycidyloxynaphthyl)methane, 1,1'-bi(3,5-glycidyloxynaphthyl)methane, 1,8'-bi(3,5-glycidyloxynaphthyl)methane, 1,2'-bi(2,7-glycidyloxynaphthyl)methane, 1,2'-bi(3,7-glycidyloxynaphthyl)methane, and 1,2'-bi(3,5-glycidyloxynaphthyl)methane; xanthene skeleton-containing epoxy monomers such as 1,3,4,5,6,8-hexamethyl-2,7-bis-oxiranylmethoxy-9-phenyl-9H-xanthene; and anthracene skeleton- or pyrene skeleton-containing epoxy monomers. These epoxy monomers may be used alone or in combination of two or more thereof.

The oxetane monomer that may be used in the surface coating layer of the invention is not particularly limited and, for example, monofunctional or difunctional oxetane monomers may also be used. For example, 3-ethyl-3-hydroxymethyl oxetane (trade name: OXT101 and the like manufactured by Toagosei Co., Ltd.), di(1-ethyl-3-oxetanyl)methyl ether (OXT221 and the like manufactured by Toagosei Co., Ltd.), and 3-ethyl-3-(2-ethylhexyloxymethyl)oxetane (OXT212 and the like manufactured by Toagosei Co., Ltd.) can be preferably used. In particular, compounds such as 3-ethyl-3-hydroxymethyl oxetane and di(1-ethyl-3-oxetanyl)methyl ether, and any known functional or difunctional oxetane compounds as described in JP 2001-220526 A and JP 2001-310937 A can be used.

Examples of the aromatic oxetane monomer include 1,4-bis[(3-ethyl-3-oxetanyl)methoxymethyl]benzene (OXT121 and the like manufactured by Toagosei Co., Ltd.), 3-ethyl-3-(phenoxymethyl)oxetane (OXT211 and the like manufactured by Toagosei Co., Ltd.), 4,4'-bis[(3-ethyl-3-oxetanyl)methoxymethyl]biphenyl, 1,4-benzenedicarboxylic acid bis[(3-ethyl-3-oxetanyl)methyl]ester, 1,4-bis[(3-ethyl-3-oxetanyl)methoxymethyl]benzene and oxetanized phenol novolac. These oxetane monomers may be used alone or in combination of two or more thereof. These are described in detail in JP 2012-163691 A.

<Fluorine-Containing Oxetane Monomer>

The oxetane monomer is not particularly limited as long as it is a fluorine-containing oxetane compound that can be cured by a cationic polymerization initiator, and a conventionally known compound can be used. The oxetane monomer is also not particularly limited in its molecular structure and molecular weight.

The fluorine-containing oxetane monomer that may be used in the invention is most preferably a compound in which some or all of hydrogen atoms in the molecule are substituted with fluorine, and examples thereof include 3-methyl-3-[[(3,3,4,4,5,5,6,6,7,7,8,8,8, tridecafluorooctyl)oxy]methyl]oxetane, 3-methyl-3-[[(2,2,3,3,4,4,5,5,6,6,7,7,8,8,8-pentadecafluorooctyl)oxy]methyl]oxetane, and 3-methyl-3-[(2,2,2-trifluoroethoxy)methyl]oxetane. These oxetane monomers may be used alone or in combination of two or more thereof.

The fluorine-containing oxetane compound is not particularly limited and specific examples thereof include 3-ethyl-3-[1-pentafluoroethyl-2,2-bis(trifluoromethyl)ethenyloxymethyl]oxetane, 3-methyl-3-[1-pentafluoroethyl-2,2-bis(trifluoromethyl)ethenyloxymethyl]oxetane, 3-ethyl-3-[1,2-difluoro-2-trifluoromethylethenyloxymethyl]oxetane, 3-methyl-3-[1, -difluoro-2-trifluoromethylethenyloxymethyl]oxetane, 3-ethyl-3-[1-trifluoromethyl-2,2-bis(heptafluoroisopropyl)ethenyloxymethyl]oxetane, 3-methyl-3-[1-trifluoromethyl-2,2-bis(heptafluoroisopropyl)ethenyloxymethyl]oxetane, 3-ethyl-3-[1,2,3-trifluoroethenyloxymethyl]oxetane, 3-methyl-3-[1,2,3-trifluoroethenyloxymethyl]oxetane, 3-ethyl-3-[2-fluoro-1,2-bis(trifluoromethyl)ethenyloxymethyl]oxetane, 3-methyl-3-[2-fluoro-1,2-bis(trifluoromethyl)ethenyloxymethyl]oxetane, 3-ethyl-3-{[1-(1-trifluoromethyl-2,2,2-trifluoroethyl)-1,2,2,3,3,3-hexafluoropropyl]oxymethyl}oxetane, 3-methyl-3-{[1-(1-trifluoromethyl-2,2,2-trifluoroethyl)-1,2,2,3,3,3-hexafluoropropyl]oxymethyl}oxetane, 3-ethyl-3-[1,1,2,3,3,3-hexafluoropropyloxymethyl]oxetane, 3-methyl-3-[1,1,2,3,3,3-hexafluoropropyloxymethyl]oxetane, 3-ethyl-3-[1,3,4,4,4-pentafluoro-1,3-bis(trifluoromethyl)-2-(heptafluoroisopropyl)butyloxymethyl]oxetane, and 3-ethyl-3-[1,3,4,4,4-pentafluoro-1,3-bis(trifluoromethyl)-2-(heptafluoroisopropyl)butyloxymethyl]oxetane, which may be used alone or in combination of two or more thereof.

The fluorine-containing epoxy compound that may be used in the invention is not limited but is a reaction product of a fluorine compound and an epoxy compound such as epichlorohydrin. Examples thereof include fluorine-containing glycidyl ethers such as glycidyl 1,1,2,2-tetrafluoroethyl ether, glycidyl 2,2,3,3-tetrafluoropropyl ether, glycidyl 2,2,3,3,4,4,5,5-octafluoropentyl ether, and 3-(1H,1H,7H-dodecafluoroheptyloxy)-1,2-epoxypropane. Other examples of the fluorine-containing epoxy compound include hexafluoropropylene oxide, 3-perfluorobutyl-1,2-epoxypropane, 3-perfluorohexyl-1,2-epoxypropane, 1,4-bis(2',3'-epoxypropyl)-perfluoro-n-butane, and 1,6-bis(2',3'-epoxypropyl)-perfluoro-n-hexane. These are described in detail in JP 2009-224109 A.

To be more specific, the following compounds can be illustrated as (3) the polymer containing a polymerizable monomer of which the polymerization is less inhibited by oxygen. A case where the surface coating layer contains as its constituent resin a polymer containing a polymerizable monomer of which the polymerization is less inhibited by oxygen is suitable to form the surface coating layer through photo-curing in the presence of oxygen or in the air.

The polymerizable monomer for use in the invention of which the polymerization is less inhibited by oxygen during curing is not limited and an acrylic monomer derivative having a structural unit represented by general formula (1) or general formula (2) shown below is preferably polymerized.

[Chemical Formula 3]

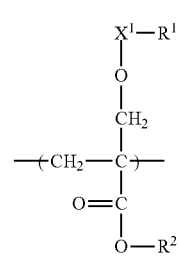

General formula (1)

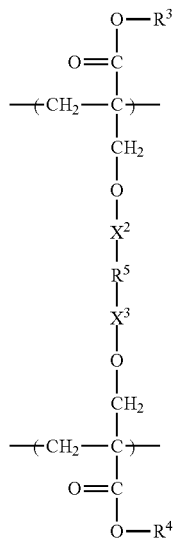

General formula (2)

[In the formulas, $R^1$ represents a hydrogen atom or a hydrocarbon group, $R^2$ to $R^4$ each independently represent a hydrocarbon group, $R^5$ represents an alkylene group which may have an ether group inserted in the chain, and $X^1$ to $X^3$ each independently represent a single bond or a carbonyl group.]

The hydrocarbon group that may be taken by $R^1$ to $R^4$ may be a saturated hydrocarbon group or an unsaturated hydrocarbon group and may have a substituent. Examples of the hydrocarbon group include an alkyl group, an alkenyl group, an aralkyl group, and an aryl group. Among these, an alkyl group is preferable. The alkyl group as used herein may be linear, branched or cyclic. Exemplary linear alkyl groups include methyl group, ethyl group, n-propyl group, n-butyl group, n-pentyl group and n-hexyl group. Exemplary branched alkyl groups include isopropyl group, isobutyl group and isopentyl group. Exemplary cyclic alkyl groups (cycloalkyl groups) include cyclopentyl group and cyclohexyl group. The alkyl group is preferably a linear alkyl group or a branched alkyl group and more preferably a linear alkyl group. The linear alkyl group preferably contains 1 to 6 carbon atoms and more preferably 1 to 4 carbon atoms. Specific examples of the alkenyl group include the foregoing alkyl groups in which some of carbon-carbon single bonds are replaced by double bonds. Specific examples of the aryl group include phenyl group, 1-naphthyl group, and 2-naphthyl group. Specific examples of the aralkyl group include the foregoing specific examples of the alkyl group substituted with any of the specific examples of the aryl group. Exemplary substituents of the hydrocarbon groups that may be taken by $R^1$ to $R^4$ include an alkoxy group and hydroxyl group, and hydroxyl group is preferable.

This case also includes a case where $R^1$ groups in general formula (1) may be taken together to form a dimer structure.

$R^3$ and $R^4$ in general formula (2) may be the same or different and a case where $R^3$ and $R^4$ are the same is preferable. More preferably $X^2$ and $X^3$ in general formula (2) are both carbonyl groups.

$R^5$ is an alkylene group which may have an ether group inserted in the chain and has a structure represented by general formula (5) shown below.

[Chemical Formula 4]

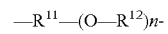

General formula (5)

In the above formula, $R^{11}$ and $R^{12}$ each independently represent an optionally substituted alkylene group. The alkylene group may be linear, branched or cyclic. Exemplary linear alkylene groups include methylene group, ethylene group, n-propylene group, n-butylene group, n-pentylene group and n-hexylene group. Exemplary branched alkyl groups include isopropylene group, isobutylene group and isopentylene group. Exemplary cyclic alkylene groups (cycloalkylene groups) include cyclopentylene group and cyclohexylene group. The alkylene group is preferably a linear alkylene group or a branched alkylene group and more preferably a linear alkylene group. The linear alkylene group preferably contains 1 to 6 carbon atoms and more preferably 1 to 4 carbon atoms. Exemplary substitutents of the alkylene group include those illustrated as the substituents of the hydrocarbon groups.

In general formula (5), n represents an integer of 0 or more. n is preferably 0 to 6 and more preferably 0 to 4. When n is 2 or more, $R^{12}$s whose number is n may be the same or different.

A plurality of types of or only one type of structure represented by general formula (1) or general formula (2) may be included in the surface coating layer. In a case where a plurality of types of structures are included, a plurality of types of structures represented by general formula (1) may be included, a plurality of types of structures represented by general formula (2) may be included, or one or more types of structures represented by general formula (1) and one or more types of structures represented by general formula (2) may coexist.

The polymer making up the surface coating layer is preferably manufactured by polymerizing a monomer mixture containing at least one type of monomer represented by general formula (3) or general formula (4) shown below.

[Chemical Formula 5]

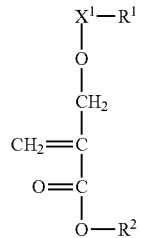

General formula (3)

-continued

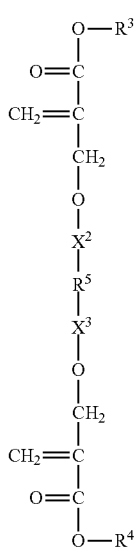

General formula (4)

In the above formulas, $R^1$ represents a hydrogen atom or a hydrocarbon group, $R^2$ to $R^4$ each independently represent a hydrocarbon group, $R^5$ represents an alkylene group which may have an ether group inserted in the chain, and $X^1$ to $X^3$ each independently represent a single bond or a carbonyl group. Detailed description and preferable ranges of $R^1$ to $R^5$ and $X^1$ to $X^3$ are the same as those given for general formula (1) and general formula (2).

Specific examples of the monomer represented by general formula (3) or general formula (4) are illustrated below but the monomer that may be used in the invention is not limited thereto. These are described in detail in JP 2009-226718 A.

[Chemical Formula 6]

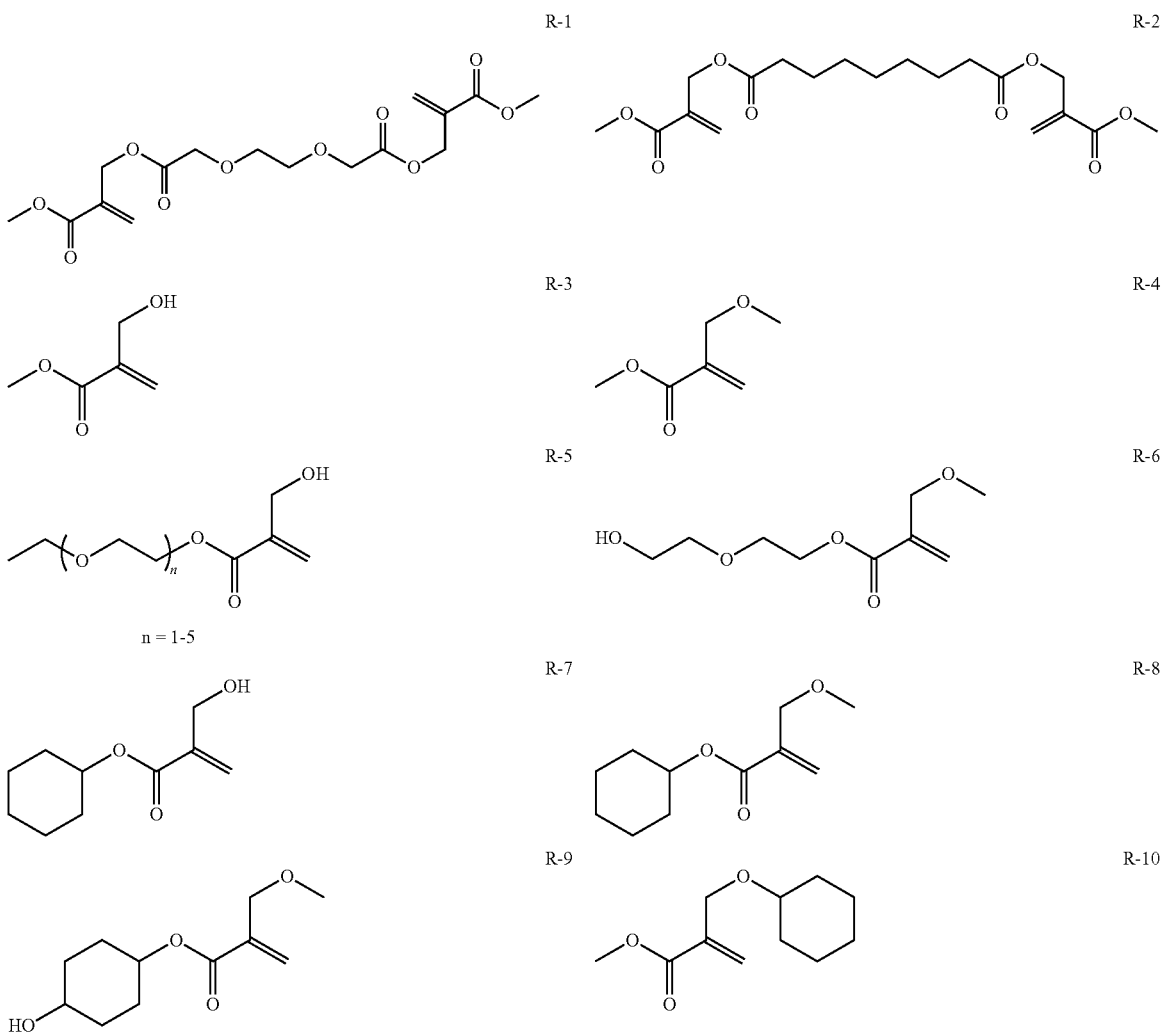

-continued

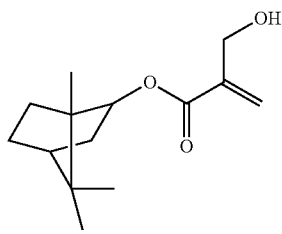
R-11

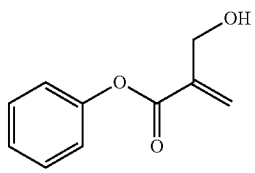
R-12

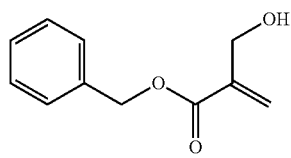
R-13

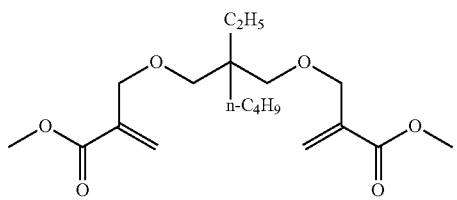
R-14

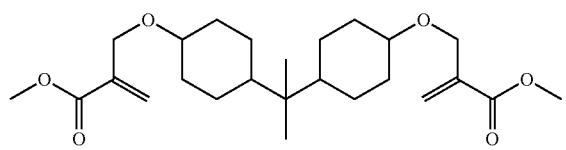
R-15

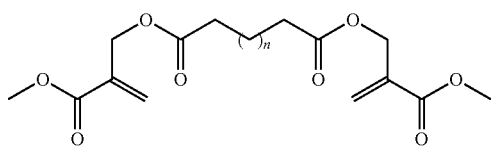
R-16 n = 1-9

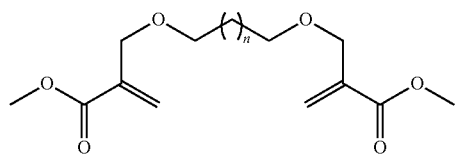
R-17 n = 1-10

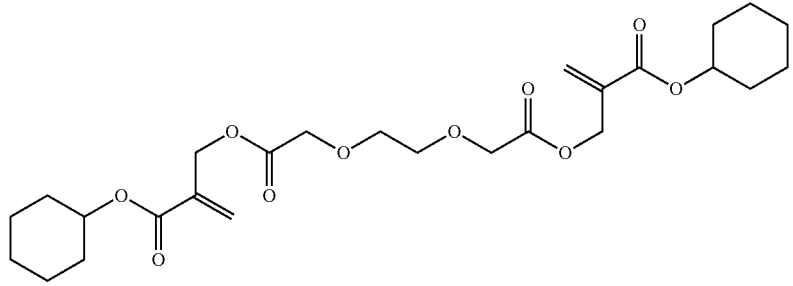
R-18

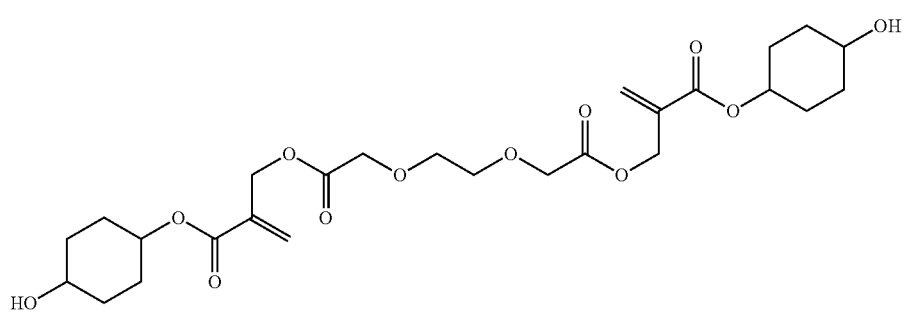
R-19

A filler such as particulate silica may be used in the surface coating layer of the invention when necessary. Addition of the filler holds promise for improving the hardness while reducing polymerization shrinkage. The filler that may be used in the invention is not particularly limited and examples thereof include inorganic fine particles and organic fine particles. The inorganic fine particles are not particularly limited, and silica fine particles, alumina fine particles, ZnO fine particles and the like are preferable, and silica fine particles are more preferable. The organic fine particles are not particularly limited. Acrylic resin, acrylonitrile resin, polyurethane, polyvinyl chloride, polystyrene, polyacrylonitrile, polyamide and the like can be used, and acrylic resin is preferable.

A solvent, a plasticizer and the like may be used in the surface coating layer of the invention when necessary.

Examples of the solvent that may be used include solvents such as hydrocarbons, hydrogen halides, ethers, esters and ketones. To be more specific, xylene and dibutyl ether can be suitably used.

Examples of the additives include a photopolymerization initiator, an antistatic agent, a leveling agent, an ultraviolet absorber, a light stabilizer, an antioxidant, an antifoaming agent, a thickener, an antisettling agent, a pigment, a dispersant, and a silane coupling agent.

The method used for polymerizing the monomers is not particularly limited, and exemplary methods that may be preferably used include thermal polymerization, photopolymerization (by ultraviolet light, visible light), electron beam polymerization, plasma polymerization, and combinations thereof. Among these, photopolymerization is most preferable. When photopolymerization is performed, a photopolymerization initiator is used in combination. Exemplary photopolymerization initiators include Irgacure series (for example, Irgacure 651, Irgacure 754, Irgacure 184, Irgacure 2959, Irgacure 907, Irgacure 369, Irgacure 379, and Irgacure 819), Darocure series (for example, Darocure TPO and Darocure 1173), and Quantacure PDO commercially available from Ciba Specialty Chemicals Inc., and Esacure series (for example, Esacure TZM and Esacure TZT) commercially available from Sartomer.

Light used for irradiation is typically ultraviolet light from a high pressure mercury vapor lamp or a low pressure mercury vapor lamp. The irradiation energy is preferably at least 95 mJ/cm$^2$, and more preferably at least 100 mJ/cm$^2$. In general, polymerization of acrylate and methacrylate is inhibited by oxygen in the air, and therefore the oxygen concentration or the oxygen partial pressure during the polymerization is preferably reduced. When a monomer which is not readily inhibited by oxygen during polymerization is used, it is not particularly necessary to reduce the pressure or reduce the oxygen concentration through nitrogen purging, and the oxygen concentration is preferably up to 50%, more preferably up to 30%, and most preferably up to 21% which is the concentration of oxygen usually contained in the air.

The surface coating layer preferably has a thickness of 0.1 to 50 μm and more preferably 0.1 to 10 μm in terms of stain-proof properties and scratch resistance.

Conventionally known coating methods such as gravure coating, reverse coating, die coating, blade coating, roll coating, air knife coating, screen coating, bar coating and curtain coating can be used to form the surface coating layer.

[Metal Reflective Layer]

As described above, the metal reflective layer for use in the invention is a layer formed on a front surface or a back surface of the resin substrate in terms of its use in a film mirror.

The material used to form the metal reflective layer is not particularly limited as long as it is a metallic material which may reflect visible light and infrared light. Specific examples thereof include silver and aluminum.

In a case where the foregoing materials such as silver and aluminum are used, other metals (e.g., gold, copper, nickel, iron, and palladium) may be incorporated in such amounts that there is no adverse effect on the reflection characteristics.

According to the invention, the thickness of the metal reflective layer is not particularly limited and is preferably 50 to 500 nm and more preferably 100 to 300 nm in terms of reflectance and the like.

According to the invention, the method of forming the metal reflective layer is not particularly limited and any of a wet process and a dry process may be applied.

An example of the wet process includes a process which is known as a so-called metal plating process.

Examples of the dry process include a vacuum deposition process, a sputtering process and an ion plating process.

[Primer Layer]

As described above, the primer layer for use in the invention is an optional layer formed in terms of the adhesion between the resin substrate and the surface coating layer, between the resin substrate and the metal reflective layer, between the metal reflective layer and the surface coating layer or between any layers other than the above combinations.

The material used to form the primer layer is not particularly limited as long as the material is capable of improving the adhesion between the resin substrate and the surface coating layer. Specific examples thereof include resin materials such as polyester resin, urethane resin, acrylic resin, urethane acrylic resin, polyamide resin, and cycloolefin polymer resin.

Among these, a hydrophilic group-containing resin is preferably used to form the primer layer because the adhesion between the resin substrate and the metal reflective layer or the surface coating layer is further improved while suppressing cure shrinkage of the surface coating layer and improving the curling resistance. To be more specific, urethane acrylate; epoxy acrylate; polyester acrylate; and polyacrylates having hydrophilic groups such as hydroxyl group, carboxy group and amino group are more preferable.

In the practice of the invention, the thickness of the primer layer is not particularly limited and is preferably 0.1 to 50 μm and more preferably 1 to 30 μm.

In the practice of the invention, the method of forming the primer layer is not particularly limited, and for example in a case where urethane acrylic resin is used to form the primer layer, an exemplary method involves applying a mixed solution of urethane acrylate (e.g., EBECRYL 8402 manufactured by Daicel-Cytec Co., Ltd.) and a photopolymerization initiator (e.g., Irgacure 184 manufactured by Ciba Specialty Chemicals Inc.) to the surface of the resin substrate and then photo-curing under exposure to ultraviolet radiation.

[Adhesion Layer]

The resin used as the binder in the adhesion layer is not particularly limited as long as conditions on the above-described adhesion, the heat resistance and the smoothness are satisfied. Polyester resin, acrylate resin, melamine resin, epoxy resin, polyamide resin, vinyl chloride resin, vinyl chloride-vinyl acetate copolymer resin and the like can be used alone or as a resin mixture thereof. Acrylate resin and a resin mixture of polyester resin and melamine resin are preferable in terms of weather resistance, and thermosetting resins obtained by mixing a curing agent such as an isocyanate thereinto are more preferable.

It is particularly preferable to use acrylate resin. Specific examples thereof include polyacrylates and polymethacrylates such as poly(methyl methacrylate) ("PMMA" acrylic resin).

The adhesion layer preferably has a thickness of 0.01 to 5 μm and more preferably 0.1 to 2 μm in terms of adhesion, smoothness, reflectance and the like.

Conventionally known coating methods such as gravure coating, reverse coating, die coating, blade coating, roll coating, air knife coating, screen coating, bar coating and curtain coating can be used to form the adhesion layer.

The material making up the adhesion layer can be selected from among a natural rubber material, a synthetic rubber material, an acrylic resin material, a silicone resin material, a polyolefin resin material, a polyvinyl ether resin material, a urethane resin material and the like, and an acrylic resin material, a polyolefin resin and a silicone resin are preferably used. An emulsion material including an adhesive ingredient dispersed in water may also be used but an organic solvent material is preferably used in terms of transparency and reduction of the remaining adhesive.

Specific examples include homopolymers or copolymers of methyl acrylate, acrylic acid, ethyl acrylate, butyl acrylate, propyl acrylate, butyl methacrylate, acrylonitrile, hydroxyethyl acrylate, isononyl acrylate, stearyl acrylate and the like. Specific examples of the polyvinyl ether resin material include polyvinyl ether and polyvinyl isobutyl ether. Specific examples of the silicone material that may be used include dimethylpolysiloxane and fluorosilicone.

[Back Coat Layer]

The back coat layer for use in the invention is an optional layer formed on a surface of the resin substrate on the side opposite to the side on which the surface coating layer is formed in terms of adjusting curling of the film mirror or the composite film.

In the practice of the invention, the back coat layer preferably has a cure shrinkage of within ±30% with respect to the cure shrinkage in the surface coating layer for the reason that curling of the film mirror or the composite film can be adjusted.

The material used to form the back coat layer as described above is not particularly limited and examples thereof include urethane resin, and monomers and resins that may be used in the above-described surface coating layer.

The back coat layer may contain an adhesive ingredient because the adhesion and the adhesiveness of the back coat layer to its adjoining materials (resin substrate and metal reflective layer) are good.

In the practice of the invention, the thickness of the back coat layer is not particularly limited and is preferably 0.5 to 50 μm and more preferably 1 to 30 μm.

In the practice of the invention, the method of forming the back coat layer is not particularly limited. For example, in a case where any of the photocurable resins and/or thermosetting resins is used to form the back coat layer, an exemplary method includes a method which involves applying a curable composition containing a low molecular weight compound (e.g., urethane acrylate) that may produce any of these resins onto the back surface of the resin substrate and then photo-curing under exposure to ultraviolet radiation or heat-curing under heating.

EXAMPLES

Examples 1 to 6 and Comparative Examples 1 to 2, 6 and 7

A PMMA film (ACRYPLEN HBS010 with a thickness of 75 μm) or an acrylic rubber film (ACRYPLEN HBS006 with a thickness of 50 μm) was used for the resin substrate and coating liquids OC-1, OC-2, OC-3 and OC-5 for forming the surface coating layer as shown in Table 2 were prepared under the following conditions. OC-4 that was used is commercially available as a photocurable urethane acrylate coating liquid (trade name: UV Self-Healing; Natoco Co., Ltd.).

Each of the coating liquids for the surface coating layer as prepared above was applied onto the resin substrate by a coating bar, dried at 80° C. for 1 minute and then cured by exposure to ultraviolet radiation to form a surface coating layer with a thickness of about 7 μm, thereby preparing composite films in Examples 1 to 6 and Comparative Examples 1, 2, 6 and 7. In Examples 1 to 4, the monomer ratio and the exposure conditions were changed to prepare the surface coating layer so that the surface hardness and the elastic recovery rate of the surface coating layer had values shown in Table 2 satisfying the ranges of more than 100 N/mm$^2$ and 60% or more, respectively.

<Preparation of Coating Liquids for Surface Coating Layer>

The following ingredient contents are expressed by wt %.

| | |
|---|---|
| (1) Coating liquid for surface coating layer OC-1 (wt %) | 45.00 |
| DEFENSA FH-700 (DIC Corporation) | |
| Silica dispersed in isopropyl alcohol (IPA) IPA-ST | 16.67 |
| (Nissan Chemical Industries, Ltd.) | |
| Isopropyl alcohol (hereinafter abbreviated as IPA) | 38.33 |

| | |
|---|---|
| (2) Coating liquid for surface coating layer OC-2 (wt %) | 6.43 |
| DEFENSA FH-700 (DIC Corporation) | |
| KAYARAD DPHA (Nippon Kayaku Co., Ltd.) | 38.13 |
| Silica dispersed in IPA IPA-ST | 16.67 |
| (Nissan Chemical Industries, Ltd.) | |
| IRGACURE 184 (BASF) | 0.44 |
| IPA | 38.33 |

| | |
|---|---|
| (3) Coating liquid for surface coating layer OC-3 (wt %) | 32.89 |
| KAYARAD DPHA (Nippon Kayaku Co., Ltd.) | |
| Silica dispersed in IPA IPA-ST | 16.67 |
| (Nissan Chemical Industries, Ltd.) | |
| IRGACURE 184 (BASF) | 0.44 |
| IPA | 50.00 |

| | |
|---|---|
| (4) Coating liquid for surface coating layer OC-4 (wt %) | 100.00 |
| Photocurable urethane acrylate coating liquid | |
| (trade name: UV Self-Healing; Natoco Co., Ltd.) | |

| | |
|---|---|
| (5) Coating liquid for surfacecoating layer OC-5 (wt %) | 50.00 |
| DEFENSA FH-700 (DIC Corporation) | |
| IPA | 50.00 |

| | |
|---|---|
| (6) Coating liquid for surface coating layer OC-6 (wt %) | 40.00 |
| DEFENSA FH-700 (DIC Corporation) | |
| Silica dispersed in IPA IPA-ST | 16.67 |
| (Nissan Chemical Industries, Ltd.) | |
| Fluorosurfactant (MEGAFACE F-554 manufactured by DIC Corporation) | 5.00 |
| IPA | 38.33 |

Comparative Example 3

The photocurable urethane acrylate-containing coating liquid OC-4 was applied onto the resin substrate by an applicator and dried at 80° C. for 5 minutes. The coating liquid was then cured by exposure to ultraviolet radiation to form a surface coating layer with a thickness of about 15 μm. A PMMA film (HBS010; thickness: 75 μm) was used for the resin substrate and the coating liquid for surface coating layer OC-4 was used for the surface coating layer. The haze value rise rate after sand blasting test was low but the haze value rise rate after scraping test using steel wool was high.

Comparative Example 4

A glass substrate (thickness: 0.7 mm) was used for the substrate instead of the PMMA, the surface coating layer was not formed and the substrate was only evaluated. UV curing was not performed and hence UV curing condition was indicated by hyphen (-) in Table 2.

Comparative Example 5

A PMMA film (HBS010 with a thickness of 75 μm) was used for the resin substrate, the surface coating layer was not formed and the substrate was only evaluated. As in Comparative Example 4, UV curing condition was indicated by hyphen (-) in Table 2.

For each of the prepared composite films, the surface hardness, the elastic recovery rate, and the surface fluorine content in the surface coating layer were determined, and haze values were measured before and after the sand blasting test and before and after the steel wool test to determine the haze value rise rates (%). In addition, the composite films were evaluated for the marker repellency, the curling resistance and the surface properties by the methods described below and the results are shown in Tables 2 and 3 below.

(1) Surface Hardness and Elastic Recovery Rate

The amount of indentation formed by an indenter pressed into a sample and the surface recovery rate of the sample just after the indenter was pressed thereinto were measured with an ultra-microhardness tester (DUH-2015 manufactured by Shimadzu Corporation) to calculate the microhardness (surface hardness) and the elastic recovery rate. The surface as used in the surface hardness and the elastic recovery rate refers to a portion to a measurement depth of about 10 nm.

(2) Haze Measurement

For each of the composite films before and after the sand blasting test and the scraping test using steel wool to be described below, the haze ratio (%) under C illuminant was measured with a haze meter (Nippon Denshoku Industries Co., Ltd.).

(3) Sand Blasting Test

The sand blasting test was performed according to the "wear testing method by means of sand blasting" specified in JIS H 8503:1989. More specifically, each of the prepared composite films was cut into a size of 3 cm square and fixed so that SiC particles collide at an angle of 45°. Then, 200 g of SiC particles were made to fall freely from a height of 100 cm to collide against the composite film. This step was repeated five times. Then, each sample was subjected to ultrasonic cleaning in pure water to remove particles attached thereto. A sample of which the haze value difference (ΔH) between before and after the sand blasting test is within 2.0% can be rated as having excellent scratch resistance.

(4) Scraping Test Using Steel Wool

Steel wool (#0000) was moved back and forth ten times under a weight of 500 g to scrape the surface of each sample. Then, each sample was subjected to ultrasonic cleaning in pure water to remove the steel wool attached thereto.

A sample of which the haze value difference (ΔH) between before and after the scraping test using steel wool is within 1.0% can be rated as having excellent scratch resistance.

(5) Measurement of Surface Fluorine Content

The number of fluorine atoms and the number of carbon atoms at the surface of each sample were measured by ESCA (XPS) to determine the ratio of the number of fluorine atoms to the number of carbon atoms in the surface layer portion as expressed by F/C.

(6) Marker Repellency Test

A line was drawn on a surface of each composite film sample with a black marker and repellency was visually checked. A sample which completely repelled was rated "A," a sample which partially repelled was rated "B" and a sample which did not repel at all was rated "C."

(7) Curling Resistance

The curling resistance was evaluated by the following curling test.

Each composite film was put on a horizontal board and a sample having an average height to the upwardly curved portions at the four corners of less than 10 mm was rated "A," a sample having an average height exceeding 10 mm was rated "C" and a sample having an average height of around 10 mm was rated "B."

Description of Evaluation of Examples and Comparative Examples

In Examples 1 to 4, the surface fluorine content is sufficient and not excessive, and the surface hardness and the elastic recovery rate take predetermined values. Accordingly, the stain-proof properties and the surface properties are excellent and the scratch resistance is also high.

The measurement result of the difference between the heat shrinkage of the resin substrate at 100° C. and the polymerization shrinkage of the surface coating layer in Example 2 was 4.6%.

Example 5 showed a relatively low surface fluorine content and the marker repellency was therefore rated as partial repellency.

In Example 6, the difference between the heat shrinkage of the resin substrate at 100° C. and the polymerization shrinkage of the surface coating layer was larger than that in Examples 1 to 4 and the curling resistance was therefore rated "B."

Comparative Example 1 adopts curing conditions under which the UV irradiation amount is small and the surface fluorine content is reduced and hence the marker repellency is rated as no repellency and the stain-proof properties are poor. In Comparative Example 2, the coating liquid for surface coating layer OC-3 free from a fluorine-containing monomer is used and hence the marker repellency is rated as no repellency and the stain-proof properties are poor. In Comparative Example 3, the surface hardness was low and hence the haze value rise rate after the scraping test using steel wool was high and the marker repellency was rated as no repellency, thus resulting in poor scratch resistance and stain-proof properties. In Comparative Example 4, the glass substrate makes up the surface layer and the haze value rise rate after the scraping test using steel wool was low but the haze value rise rate after the sand blasting test was high and the scratch resistance was not sufficient. Curling occurs in Comparative Example 6 because of a large difference between the heat shrinkage of the substrate and the polymerization shrinkage of the surface coating layer, and the curling resistance is poor. In Comparative Example 7, surface unevenness occurred due to excessive addition of a fluorosurfactant, resulting in poor surface properties.

TABLE 2

|  | Resin substrate | Coating liquid for coating layer | UV irradiation amount (mJ/cm2) | Surface hardness (N/mm2) | Elastic recovery rate (%) | Surface fluorine content in coating layer F/C atom ratio |
| --- | --- | --- | --- | --- | --- | --- |
| EX 1 | PMMA | OC-1 | 224 | 201 | 76 | 0.47 |
| EX 2 | PMMA | OC-1 | 135 | 157 | 68 | 0.47 |
| EX 3 | PMMA | OC-1 | 95 | 137 | 63 | 0.46 |
| EX 4 | PMMA | OC-2 | 224 | 153 | 76 | 0.30 |
| EX 5 | PMMA | OC-2 | 135 | 139 | 71 | 0.22 |
| EX 6 | Acrylic rubber | OC-5 | 224 | 155 | 76 | 0.47 |
| CE 1 | PMMA | OC-2 | 95 | 77 | 37 | 0.18 |
| CE 2 | PMMA | OC-3 | 135 | 186 | 75 | 0 |
| CE 3 | PMMA | OC-4 | 135 | 2 | 88 | 0.58 |
| CE 4 | Glass sheet | None | — | 601 | 57 | 0 |
| CE 5 | PMMA | None | — | 79 | 38 | 0 |
| CE 6 | Acrylic rubber | OC-1 | 224 | 201 | 76 | 0.47 |
| CE 7 | PMMA | OC-6 | 224 | 185 | 72 | 1.05 |

TABLE 3

|  | Haze value rise rate after sand blasting test (%) | Haze value rise rate after steel wool test (%) | Marker repellency | Curling resistance | Surface properties |
| --- | --- | --- | --- | --- | --- |
| EX 1 | 0.99 | 0.70 | A | A | A |
| EX 2 | 1.83 | 0.70 | A | A | A |
| EX 3 | 1.62 | 0.70 | A | A | A |
| EX 4 | 1.41 | 0.70 | A | A | A |
| EX 5 | 1.79 | 0.72 | B | A | A |
| EX 6 | 1.66 | 0.70 | A | B | A |
| CE 1 | 15.5 | 2.86 | C | A | A |
| CE 2 | 1.43 | 0.70 | C | B | A |
| CE 3 | 0.96 | 40.42 | C | A | A |
| CE 4 | 10.30 | 0.12 | C | A | A |
| CE 5 | 39.1 | 43.58 | C | A | A |
| CE 6 | 0.99 | 0.60 | A | C | A |
| CE 7 | 1.02 | 0.70 | A | A | C |

Examples 7 and 8

A silver-containing metal reflective layer was formed by electroplating between the resin substrate and the surface coating layer in Example 1 and between the resin substrate and the surface coating layer in Example 6, thereby preparing film mirrors of the invention. However, the film mirror in Example 7 was prepared by mixing a polymer obtained by polymerizing Monomer R-1 represented by general formula (3) into the surface coating layer in Example 1 in an amount of 60 wt % and photopolymerizing in the presence of 25% oxygen. The reflectance of the prepared film mirrors was measured with a spectrophotometer (UV-3100PC manufactured by Shimadzu Corporation) and the film mirrors were found to have high reflective performance at wavelengths ranging from visible to near infrared.

Examples 9 and 10

Composite films including the surface coating layer-bearing resin substrates as described in Examples 1 and 6, respectively, provided that the PMMA films each had a thickness of 35 μm were bonded to a silver-containing metal reflective layer formed by electroplating on a PET film with a thickness of 70 μm by thermocompression bonding using an adhesive under conditions of 120° C. and a load of 0.5 Pa, thereby preparing film mirrors of the invention. The reflectance of the prepared film mirrors was measured with a spectrophotometer (UV-3100PC manufactured by Shimadzu Corporation) and the film mirrors were found to have high reflective performance at wavelengths ranging from visible to near infrared.

What is claimed is:

1. A film mirror comprising: a resin substrate; a metal reflective layer; and a surface coating layer, wherein a ratio of a number of fluorine atoms to a number of carbon atoms in a surface layer portion of the surface coating layer as expressed by F/C is 0.21 to 1.00 and wherein the surface coating layer has a surface hardness of more than 100 N/mm2 and an elastic recovery rate of 60% or more, wherein a resin making up the surface coating layer contains a polymerizable monomer of which polymerization is less inhibited by oxygen, the polymerizable monomer represented by general formula (1) or general formula (2) shown below:

[Chemical Formula 1]

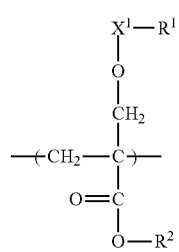

General formula (1)

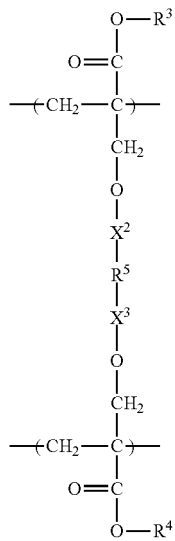

General formula (2)

wherein R1 represents a hydrogen atom or a hydrocarbon group, R2 to R4 each independently represent a hydrocarbon group, R5 represents an alkylene group which may have an ether group inserted in a chain, and X1 to X3 each independently represent a single bond or a carbonyl group.

2. The film mirror according to claim 1, wherein a resin making up the surface coating layer contains a polymer of monomers including at least one type of fluorine-containing monomer.

3. The film mirror according to claim 1, wherein a resin making up the surface coating layer contains a polymer of monomers including at least one type of fluorine-containing acrylate monomer and at least one type of non-fluorine-containing polyfunctional acrylate monomer.

4. The film mirror according to claim 1, wherein a resin making up the surface coating layer contains a polymer of monomers including at least one type of fluorine-containing epoxy and/or oxetane monomer and at least one type of non-fluorine-containing epoxy and/or oxetane monomer.

5. The film mirror according to claim 1, wherein the surface coating layer is formed by photo-curing under exposure to ultraviolet radiation at an accumulated light quantity of 95 mJ/cm² or more.

6. The film mirror according to claim 1, wherein the surface coating layer is formed by photo-curing in presence of oxygen.

7. The film mirror according to claim 1, wherein a resin making up the surface coating layer contains a polymerizable monomer of which polymerization is less inhibited by oxygen.

8. The film mirror according to claim 1, wherein a difference between heat shrinkage of the resin substrate at 100° C. and polymerization shrinkage of the surface coating layer as represented by [(heat shrinkage of resin substrate)−(polymerization shrinkage of surface coating layer)] is within 10%.

9. The film mirror according to claim 1 for use in concentration of sunlight.

10. A film mirror comprising: a first resin substrate; a metal reflective layer; a second resin substrate; and a surface coating layer, wherein a ratio of a number of fluorine atoms to a number of carbon atoms in a surface layer portion of the surface coating layer as expressed by F/C is 0.21 to 1.00 and wherein the surface coating layer has a hardness of more than 100 N/mm2 and an elastic recovery rate of 60% or more, wherein a resin making up the surface coating layer contains a polymerizable monomer of which polymerization is less inhibited by oxygen, the polymerizable monomer represented by general formula (1) or general formula (2) shown below:

[Chemical Formula 1]

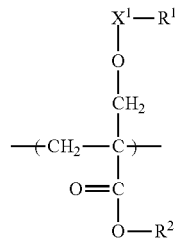

General formula (1)

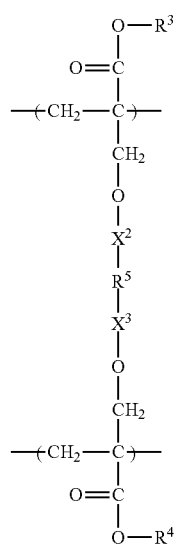

General formula (2)

wherein R1 represents a hydrogen atom or a hydrocarbon group, R2 to R4 each independently represent a hydrocarbon group, R5 represents an alkylene group which may have an ether group inserted in a chain, and X1 to X3 each independently represent a single bond or a carbonyl group.

11. The film mirror according to claim 4, wherein the surface coating layer is formed by photo-curing under exposure to ultraviolet radiation at an accumulated light quantity of 95 mJ/cm² or more.

12. The film mirror according to claim 4, wherein a difference between heat shrinkage of the resin substrate at 100° C. and polymerization shrinkage of the surface coating layer as represented by [(heat shrinkage of resin substrate)−(polymerization shrinkage of surface coating layer)] is within 10%.

13. The film mirror according to claim 10 for use in concentration of sunlight.

14. The film mirror according to claim 10, wherein a difference between heat shrinkage of the each resin substrates at 100° C. and polymerization shrinkage of the surface coating layer as represented by [(heat shrinkage of resin substrate)−(polymerization shrinkage of surface coating layer)] is within 10%.

* * * * *